United States Patent [19]
Brent et al.

[11] Patent Number: 5,855,935
[45] Date of Patent: Jan. 5, 1999

[54] APPARATUS FOR INJECTION MOULDING

[76] Inventors: David Rudy Brent, 4 Raeburn Close, Kingston upon Thames, Surry KT1 4HL; Gerald Dennis Day, 72 Gospel Farm Road, Acocks Green, Birmingham B27 7LJ, both of United Kingdom

[21] Appl. No.: 556,630

[22] Filed: Nov. 13, 1995

Related U.S. Application Data

[63] Continuation of Ser. No. 84,190, filed as PCT/GB91/00004, Jan. 3, 1991, abandoned.

[51] Int. Cl.$^6$ .................................................. B29C 45/26
[52] U.S. Cl. ........................... 425/574; 425/576; 425/589
[58] Field of Search .................................... 425/574, 575, 425/576, 589, 526, 534, 547, 548, 552, 577

[56] References Cited

U.S. PATENT DOCUMENTS

| | | | |
|---|---|---|---|
| 2,828,508 | 4/1958 | Labarre | 425/576 |
| 3,833,329 | 9/1974 | Ulmachneider et al. | 425/576 |
| 4,424,015 | 1/1984 | Black et al. | 425/576 |
| 4,439,394 | 3/1984 | Appleyard | 425/526 |
| 4,652,229 | 3/1987 | Mehnert et al. | 425/577 |
| 4,726,757 | 2/1988 | Berry | 425/574 |
| 4,773,842 | 9/1988 | Aoki | 425/574 |

FOREIGN PATENT DOCUMENTS

| | | |
|---|---|---|
| 0060536 | 9/1982 | European Pat. Off. . |
| 1159593 | 6/1958 | France . |
| 465841 | 1/1969 | Switzerland . |
| 558620 | 1/1944 | United Kingdom . |
| 995243 | 6/1965 | United Kingdom . |
| 1078552 | 8/1967 | United Kingdom . |
| 101913 | 2/1968 | United Kingdom . |
| 1316742 | 5/1973 | United Kingdom . |
| 2235151 | 2/1991 | United Kingdom . |

OTHER PUBLICATIONS

Webster's Ninth New Collegiate Dictionary, p. 1152, 1983.

Primary Examiner—Tim Heitbrink

[57] ABSTRACT

Injection moulding apparatus consists of a rotary carrier (11) which transports a number of mould sets (14,15) in turn through an injection station (46), cooling stations (35) and a mould opening station (27). The injection body (62) is upwardly arranged, and there is a positioning device (71–74) for adjusting the position of the injection head (60) when in an injection position and in a withdrawn position, and a further positioning device (65,66) for moving the injection head (60) relative to the injection body. The clamping device (47) at the injection station and the cooling device (36,37) at the cooling station can also be used as heat transfer devices. The sprue formed between the mould cavity (17) and the inlet (18) of the mould set can be severed while the mould set is closed. During transfer between the injection station and the opening station, tools (14) and (15) of the mould set are held in a closed condition by connectors (16) and retaining elements (21,22) which are part of the mould set. There are openings in the carrier that provide access for devices to operate on the mould set.

57 Claims, 9 Drawing Sheets

APPARATUS FOR INJECTION MOULDING

This is a continuation of application Ser. No. 08/084,190 filed as PCT/GB91/00004, Jan. 3, 1991 now abandoned.

BACKGROUND AND SUMMARY OF THE INVENTION

From one aspect, the present invention relates to injection moulding apparatus. As used herein, the term injection moulding apparatus embraces apparatus used for injecting a plastics moulding composition into a mould cavity and apparatus used for injecting molten metal into a mould cavity, commonly called die-casting apparatus.

Apparatus which is commonly used for injection moulding comprises two platens, on which are fixed respective tools of a set of moulding tools. The apparatus also includes means for moving one of the platens relative to the other for opening and closing the set of tools. Means is provided for injecting a moulding composition through the tool on the stationary platen to the mould cavity, when the tools are closed. It is necessary to maintain the set of tools in a closed condition until the moulding has cooled sufficiently to acquire dimensional stability. A substantial proportion of the operating cycle of the apparatus is represented by a cooling time, during which the platens must be held stationary relative to each other. This is achieved by maintaining in operation throughout the cooling time hydraulic pumps used to establish the mould-closing pressure. One object of the present invention is to improve the efficiency of an injection moulding operation. Further objects include improving the efficiency of cooling of a set of mould tools.

According to a first aspect of the present invention, there is provided injection moulding apparatus comprising a plurality of mould sets, an injection head, transport means for imparting relative movement to the mould sets and the injection head to bring the injection head into proximity with the mould sets in sequence, feed means for feeding a moulding composition through the injection head into a mould set when that mould set is in proximity with the injection head and clamping means for clamping in a closed condition at least one of said mould sets whilst the moulding composition is injected through the injection head into the mould set.

In in accordance with the first aspect of the invention, after injection of the moulding composition into a first mould set, the injection head can be used to inject moulding composition into a second mould set before the moulding formed in the first mould sets has cooled sufficiently to permit removal of that moulding from the first mould set. The interval between successive injection operations does not depend upon the required cooling time.

According to a second aspect of the invention, there is provided a method of moulding a composition wherein an injection head is used to inject the moulding composition into each of a plurality of mould sets in turn.

According to a third aspect of the invention, there is provided an injection moulding tool set comprising first and second tool parts which collectively define a mould cavity and comprising retaining means for releasably retaining the tool parts in a closed condition. A tool set embodying the third aspect of the invention is especially suitable for use in a method according to the second aspect of the invention.

Relative movement of the mould sets and the injection head may be achieved by maintaining the injection head at an injection station and moving the mould sets in turn into the injection station. Alternatively, the relative movement may be achieved by maintaining the mould sets in respective stations and moving the injection head to those stations in turn.

The transport means used for imparting relative movement to the mould sets and the injection head may be adapted to locate each mould set in turn accurately in relation to the injection head. Alternatively, there may be provided, in addition to the transport means, locating means for locating each mould set in turn accurately relative to the injection head. The transport means may comprise a conveyor of generally known form for conveying the tool sets sequentially to the injection station. Alternatively, the transport means may comprise a track defining a path along which the mould sets move to the injection station and propulsion means for imparting motion to the mould sets which are on or in the track. The propulsion means may be adapted to drive the mould sets by means of air pressure, magnetic field or other known means. The mould sets may be guided along the track and/or supported in the path, at least when moving, by air pressure, magnetic field or other known means. In a case where the mould sets remain in respective stations and the injection head is moved from one mould set to another, the injection head may be transported by a conveyor of known kind or may be driven along a track by known propulsion means hereinbefore mentioned and supported by known means mentioned herein. Also in a case where the injection head is moved from one mould set to another, transport means for transporting the injection head may be adapted to establish accurately a predetermined position of the injection head relative to each mould set in turn or there may be provided in addition to the transport means locating means for establishing accurately the required position.

In a case where either the mould sets or the injection head are or is moved along a track, guidance along the track may be achieved by known means which do not rely upon physical contact, for example guidance by means of electromagnetic radiation or by means of an electromagnetic field associated with a conductor buried in a floor.

Means for performing operations additional to injection may be positioned at stations additional to an injection station or may be transported along the path along which the injection head is transported.

Means for applying heat to or extracting heat from the mould sets may be moved to the mould sets in turn, either following a path which is followed by the injection head or following a different path. Means for opening the mould sets may be moved to each of the mould sets in turn, either following the path along which the injection head moves or following a different path.

In a case where the mould sets are moved in turn into an injection station, the mould sets are preferably moved through additional stations including a heat transfer station and an opening station.

There may be provided a plurality of injection heads through which respective moulding compositions are injected into the mould sets. These compositions may differ in respect of colour or in respect of other characteristics. In a case where respective moulding compositions are injected through a plurality of heads into each mould set, these may be injected into each mould set concurrently through respective inlet nozzles or sequentially. An injecting relation may be established between the mould set and the injection heads in turn.

In a case where more than one injection head is provided, these may be moved along a common path from one mould set to another or may be disposed at respective injection stations through which the mould sets are transported.

In a case where means additional to one injection head moves from one mould set to another, movement of the additional means may be independent of movement of the injection head. Alternatively, these may be mounted on a common carrier which carries them to the mould sets in turn. In a case where the mould sets are mounted on a common carrier and are moved through successive stations, a particular mould set may pass through one or more stations without any operation being performed on that particular mould set at that particular station or stations. Thus, the actions to which one mould set is subjected at successive stations may be selected independently of the actions to which another mould set is subjected during travel along the same path.

According to a further aspect of the invention, injection moulding apparatus comprises a carrier for carrying a plurality of mould sets, an injection head, feed means for feeding a moulding composition through the injection head into a mould set and clamping means for clamping at least one of the mould sets in a closed condition whilst the moulding composition is injected through the injection head into that mould set, wherein the carrier is arranged for moving the mould sets, when carried on the carrier, around an orbital path, wherein the feed means is on the inside of said path and wherein the injection head extends from the feed means to said path. This arrangement has the advantage that a relatively compact apparatus can be achieved. Furthermore, there is at the outside of the orbital path space for accommodating the clamping means and this space is not restricted by the feed means and injection head.

The feed means preferably includes a feed screw which is rotatable about an axis transverse to said path. Generally, the path along which the mould sets are moved by the carrier will be horizontal. In this case, the injection head is preferably disposed at a level above the feed screw and the feed screw is arranged to feed the moulding composition upwardly to the injection head. This arrangement has the advantage that gravity will tend to cause the moulding composition to move in a direction from the injection head towards the feed screw and the risk of moulding composition escaping from the injection head under the action of gravity in an uncontrolled manner is substantially eliminated. Furthermore, the arrangement provides the possibility of removing the injection head and replacing it with a fresh injection head whilst the moulding composition is supported by the feed screw and in a molten condition.

Preferably, the moulding composition is moved upwards during melting and is injected downwards.

The apparatus preferably includes a housing which substantially encloses the moving parts of the apparatus. The atmosphere within the housing may be monitored and/or may be controlled. There may be provided inside the housing a smoke-detector or a temperature-responsive device suitable for providing an alarm signal if a fire occurs inside the housing. In the event of a fire occurring inside the housing, the housing will restrict access of air to the fire and an inert gas or other fire-extinguishing medium may be discharged inside the housing to extinguish the fire.

Operation of the apparatus is preferably controlled by a microprocessor. Information relating to mouldings to be produced by the apparatus and relating to mould sets present in the apparatus may be applied to the microprocessor through known input devices, for example a keyboard, a disc drive or a tape reader. The microprocessor may have an interface with other components of a control system of the apparatus which facilitates the transfer of information between the control system of one apparatus embodying the invention and the control system of further apparatus. Thus, if a programme suitable for controlling operation of the apparatus to produce certain mouldings is applied to the microprocessor of first apparatus, that programme may be transferred to further apparatus or the further apparatus may be controlled by the microprocessor of the first apparatus to cause the further apparatus to produce the same or similar mouldings.

The clamping means may remain at the injection station in a case where the mould sets are moved through the injection station. Alternatively, the clamping means may move with the mould sets through the injection station and other stations. In a case where the injection head moves to the mould sets in turn, the clamping means also may be moved to each of the mould sets in turn. Alternatively, respective clamping means may be provided for each mould set, the clamping means remaining with the mould set when the injection head moves from one mould set to another.

Preferred features of injection moulding apparatus in accordance with the first aspect of the invention and other aspects of the invention are defined in the claims appended hereto.

BRIEF DESCRIPTION OF THE DRAWINGS

An example of injection moulding apparatus embodying the present invention and which is used in a method according to the present invention will now be described, with reference to the accompanying drawings, wherein.

DESCRIPTION OF THE PREFERRED EMBODIMENT

Figure 2:
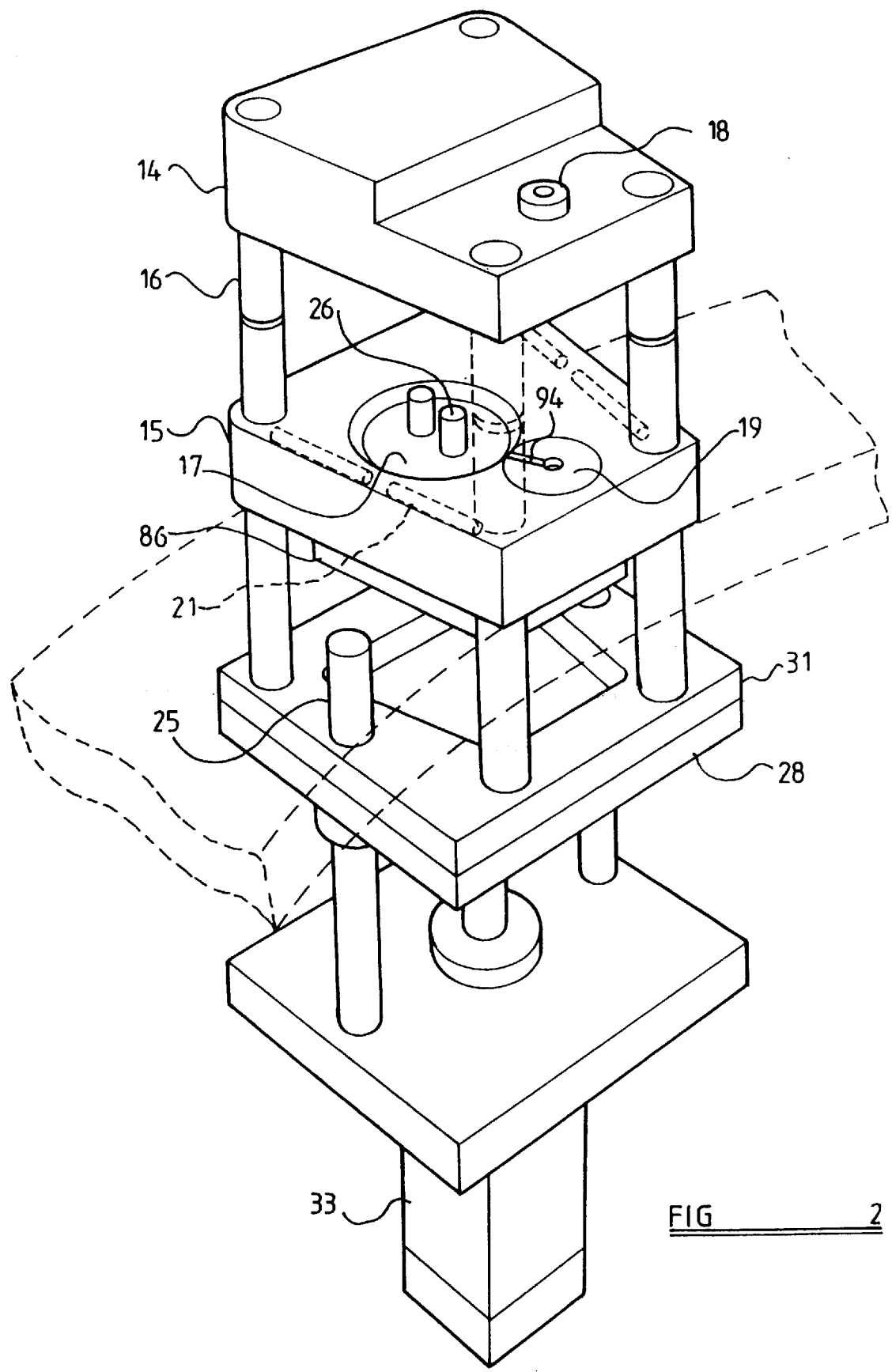
FIG. 2 is a perspective view of a moulding set used in the apparatus of FIG. 1, together with equipment provided at an opening station of the apparatus of FIG. 1.
Figure 3:
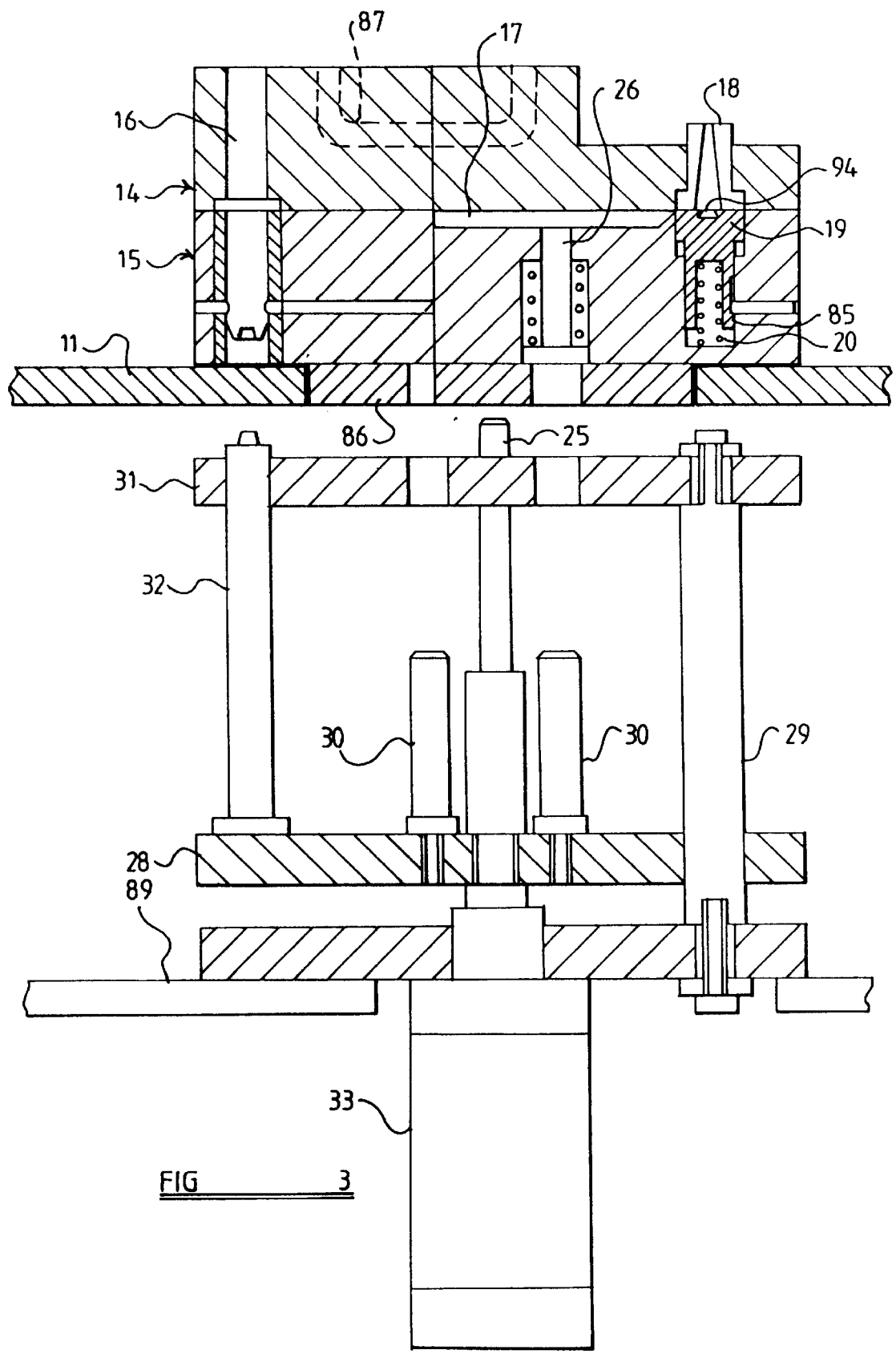
FIG. 3 shows a cross section on the line III—III through equipment shown in FIG. 2.
Figure 4:
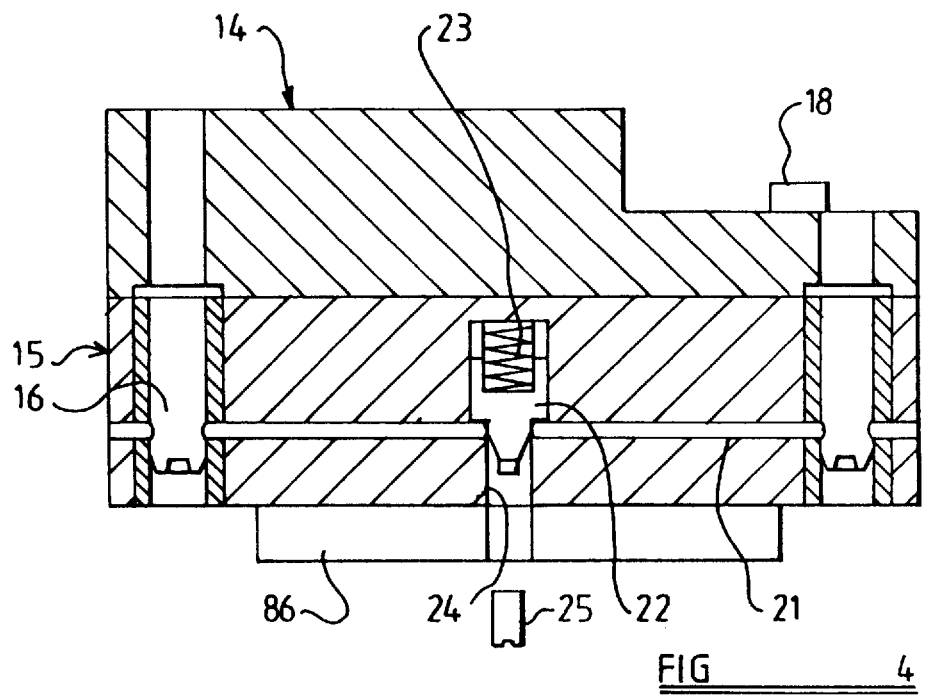
FIG. 4 shows a further cross section on the line IV—IV through the mould set of FIG. 2.

The moulding apparatus illustrated in the accompanying drawings comprises a hollow body 10 which typically stands on a floor and does not move during use of the machine. There is used with the machine a number of mould sets which may be identical with one another or which may differ from one another. An example of a suitable mould set is illustrated in FIGS. 2, 3 and 4. In the body 10, there is mounted transport means comprising a carrier 11 suitable for carrying a plurality of the mould sets and for moving the mould sets in turn along a orbital path through a number of stations. In the particular example illustrated, the carrier 11 is arranged for rotation relative to the body 10 about a carrier axis 12 and the carrier axis is upright. The carrier is adapted to support the mould sets in respective positions which are spaced substantially the same distance from the carrier axis 12. Conveniently, the carrier is circular and the mould sets are mounted adjacent to the periphery of the carrier and are spaced apart equally around the axis 12. A representative mould set is shown at 13 in FIG. 1.

Figure 10:
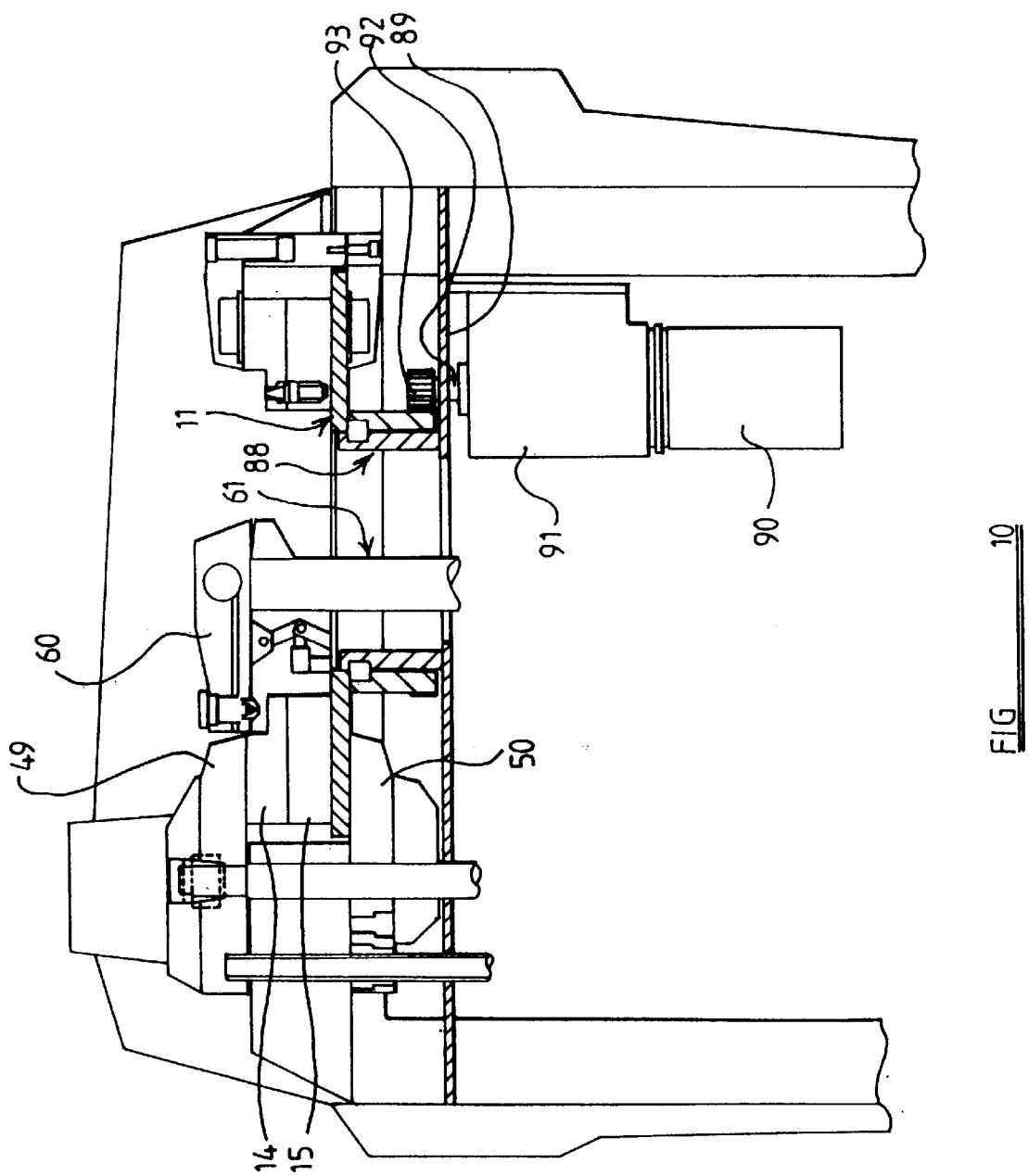
FIG. 10 shows certain parts of the apparatus in cross section in a plane which contains an axis of rotation of a carrier of the apparatus, in conjunction with certain further parts shown in elevation
Figure 11:
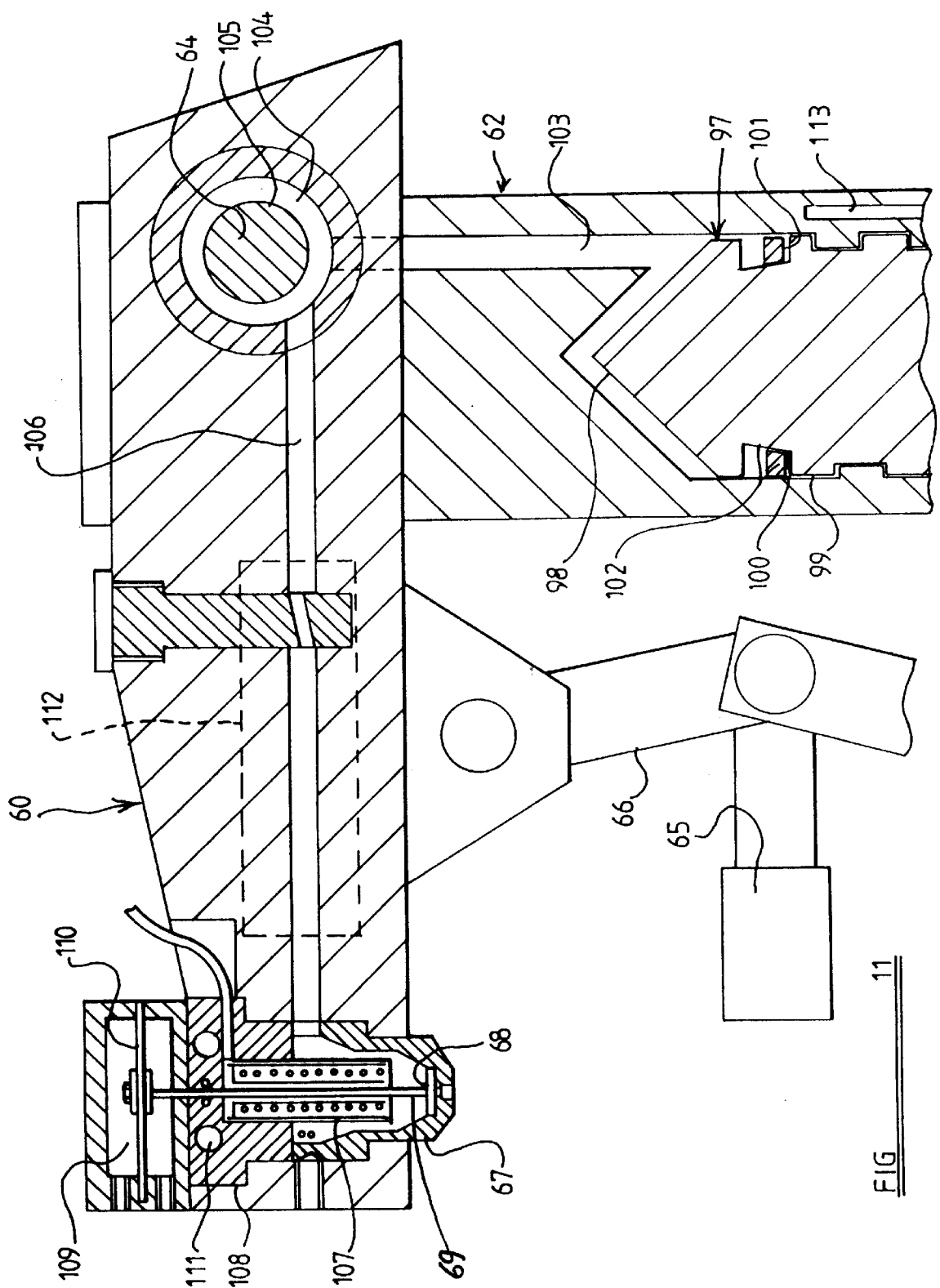
FIG. 11 shows a cross section through an injection head and an adjacent part of feed means of the apparatus.

The carrier 11 is annular and is supported from the body 10 by a bearing 88 shown in FIG. 10 and disposed adjacent to the inner periphery of the carrier and below the carrier. The bearing 88 is supported by support plate 89 incorporated in the body 10. This plate is substantially and is spaced downwardly a substantial distance from the carrier 11 so that the bearing 88 lies generally between the carrier and the support plate 89. An electric motor 90 and associated gear box 91 for driving the carrier 11 relative to the body 10 are mounted in the body 10 beneath the support plate 89. A drive shaft 92 extends upwardly from the gear box 91 through an opening in the support plate 89 and carries a sprocket 93 which meshes with teeth formed on that part of the bearing 88 which is fixed with respect to the carrier 11. The motor 90 is capable of establishing a pre-determined angular position of the carrier 11 within a very small tolerance so that the motor and carrier are capable of carrying mould sets from station to station and also of locating each mould set accurately in a required position at each station.

The mould set 13 is illustrated in greater detail in FIGS. 2, 3 and 4. The mould set comprises a first tool 14, a second tool 15 and a plurality of spaced connectors 16. Each connector is in the form of an elongated shaft having one end portion which is fixed with respect to the first tool 14 and an opposite end portion which can slide in an opening in the second tool. Preferably, this opening extends completely through the second tool. The connectors 16 guide the first and second tools for relative movement along a rectilinear path between an open condition illustrated in FIG. 2, in which the tools are spaced apart, and a closed condition in which the tools are in mutual contact at an interface. At the interface, the tools 14 and 15 collectively define a mould cavity 17 in which a moulding is to be formed. The mould cavity may be formed entirely in one or other of the tools or partly in each of the tools.

The mould set further comprises a guide plate 86 which is rigidly secured to the tool 15 at the face thereof remote from the tool 14. As viewed in a direction along the axis 12, the guide plate 86 is considerably smaller than is the tool 15 and the guide plate is inset from the periphery of the tool. The guide plate is received in a complimentary opening formed in the carrier 11 and the tool 15 rests on the carrier adjacent to the opening. The tool 15 is located precisely in a predetermined position relative to the carrier 11 by means of dowels (not shown) and is secured to the carrier by bolts (not shown). The depth of the guide plate 86 may be somewhat greater than the depth of the carrier 11, so that the guide plate protrudes slightly at the underside of the carrier.

An inlet for admitting a moulding composition to the mould set is formed in an inlet nozzle 18 which is mounted in the first tool 14 for limited movement relative thereto in a direction towards and away from the second tool 15. The inlet nozzle is guided for sliding movement in the first tool 14 along a path which is offset from the mould cavity 17. A sprue element 19 is mounted in the second tool 15 for sliding relative thereto along a path which is an extension of the path along which the inlet nozzle 18 slides. The sprue element is biased towards the inlet nozzle 18 by a spring 20 acting between the sprue element and the second tool 15. The sprue element bears on the inlet nozzle 18 adjacent to the interface between the tools 14 and 15. Movement of the sprue element 19 and inlet nozzle 18 in a direction from the tool 15 towards the tool 14 is limited by engagement of a shoulder on the inlet nozzle 18 with a shoulder on the first tool 14. Movement in the opposite direction is limited by engagement of the sprue element 19 with a shoulder on the second tool 15.

There is formed in one of the sprue element 19 and inlet nozzle 18 a sprue passage 94 which, when the sprue element 19 is in the charging position (not illustrated) in which it rests on the shoulder of the second tool 15, provides communication between the mould cavity 17 and the inlet defined by the nozzle 18. When the sprue element 19 is in the severing position illustrated in FIG. 3 and the inlet nozzle 18 bears on the shoulder of the first tool 14, the sprue passage is out of communication with the mould cavity 17 and any moulding composition occupying the sprue passage is therefore separated from a moulding formed in the cavity.

There is provided in the second tool 15 holding means for retaining the connectors 16 in the fully inserted positions illustrated in FIG. 4, which correspond to the closed condition of the tool set. The holding means comprises a plurality of holding elements 21, one for each connector 16. Each holding element is in the form of a rectilinear rod and is slidably mounted in a corresponding bore formed in the second tool 15 with a longitudinal axis of the rod perpendicular to a longitudinal axis of the corresponding connector. Each holding element is slidable relative to the second tool 15 between the holding position illustrated in FIG. 4, in which an end portion of the holding element is seated in a complimentary recess formed in the corresponding connector 16, and a releasing position in which the holding element is withdrawn from the recess in the corresponding connector. When seated in the recess, the holding element restrains movement of the corresponding connector relative to the second tool 15 from the position shown in FIG. 4. The holding elements and the connectors thus constitute parts of retaining means for retaining the tools 14 and 15 in the closed position illustrated in FIG. 4.

The retaining means further comprises a locking element 22 which is mounted in the second tool 15 for movement relative thereto along a path which is transverse to the paths of the holding elements 21. There is associated with the locking element a spring 23 which urges the locking element into the locking position shown in FIG. 4, in which the locking element obstructs movement of the holding elements 21 from their holding positions. There is in the second tool 15 sufficient space to permit movement of the locking element 22 against the action of the spring 23 from the locking position into a releasing position in which the locking element permits movement of the holding elements 21 from their holding positions to their releasing positions. An end portion of the locking element 22 which is remote from the spring 23 is accessible along a bore 24 in the second tool 15 to facilitate movement of the locking element from its releasing position to its locking position by the action of a finger 25 which can be inserted along the bore 24. The finger 25 is supported from the body 10 at a releasing station.

When the finger 25 is withdrawn from the locking element 22, the spring 23 urges the locking element onto the holding elements 21 so that these are driven by a camming action towards the connectors 16. There is sufficient clearance between the locking element 22 and the second tool 15 to permit sufficient movement of the locking element relative to the second tool in directions along the holding elements 21 to ensure that the pressure derived from the spring 23 is exerted substantially equally by the locking element 22 on the holding elements. This ensures that both holding elements are driven fully home into the recess of the corresponding connector 16. Furthermore, a tapered portion of the locking element 22 lies between the holding elements and movement of the locking element into the locking position illustrated in FIG. 4 is limited only by engagement of the holding elements with the connectors 16. Accordingly, any wear of the components which occurs during the service life of the mould set does not impair the ability of the locking element 22 to seat both of the holding elements in their recesses in the connectors. Any wear which does occur merely permits the tapered portion of the locking element to move slightly further under the action of the spring 23. When the locking element has been driven by the spring into its locking position, there is no free-play between the connectors, the holding elements and the locking element, even after some wear has occurred.

In place of the mechanical retaining means illustrated in the accompanying drawings, there may be provided electro-magnetic or electro-mechanical retaining means for retaining the tools 14 and 15 in the closed condition. Furthermore, the retaining means may include hydraulic components, for example pistons or diaphragms which are moved by hydraulic pressure to perform a locking function and an hydraulic accumulator to maintain the hydraulic pressure when the mould set is disconnected from a source of hydraulic pressure. At the releasing station, the tool set may be connected with the source of hydraulic pressure so that the pressure can be reduced to effect or permit unlocking and then re-established to re-lock the mould set. Similarly, in a case where the retaining means is electro-magnetic or electro-mechanical, the mould set may have an electrical circuit which is connected temporarily with a source of electrical power at the opening station or a magnetic circuit of the tool set may be connected temporarily with a magnetic circuit at the opening station. By a magnetic circuit, we mean a path of high magnetic permeability.

There are also mounted in the second tool 15 a pair of ejector pins, one of which is shown at 26. The ejector pins 26 have respective end surfaces which form a part of the boundary of the mould cavity. Each ejector pin is spring loaded to a position in which this end surface of the pin is flush with an adjacent part of the boundary of the mould cavity. The ejector pins are arranged for movement relative to the second tool, when the tool set is in an open condition, to respective positions shown in FIG. 2 in which the ejector pins extend upwardly through that part of the mould cavity which is formed in the tool 15 to eject a moulding from that part of the cavity.

There may be defined between the first and second tools 14 and 15 more than one mould cavity, in which case there would be formed at the interface between the inlet nozzle 18 and the sprue element 19 a corresponding number of sprue passages, one for each mould cavity. Furthermore, at least one ejector pin would be provided for each mould cavity. In a case where more than one mould cavity is defined between the tools 14 and 15, the sprue element 19 extends to each of these cavities so that when the sprue element moves to its severing position, the moulding composition occupying each of the sprue passages leading to the mould cavities is separated from the plastics composition in those mould cavities. The mouldings subsequently ejected from the mould cavities do not require de-spruing.

At an opening station 27, there is mounted on the body 10 opening means shown in FIG. 3 for opening the tool set 14, 15. The opening means includes a slide 28 guided on guide bars, one of which is shown at 29, for reciprocation relative to the body 10 between the retracted position shown in FIG. 3 and an extended position in which plungers 30 mounted on the slide 28 extend through respective openings in a guide plate 31 and project from the guide plate into the second tool 15 of a set of tools at the opening station. In the projected position, the plungers 30 engage the ejector pins 26 and hold these in respective ejecting positions.

The finger 25 is mounted on the slide 28 in a guide tube containing a spring which allows the stroke of the finger 25 to be shorter than that of the slide.

There is also mounted on the slide 28 a number of pushers 32 corresponding to the number of connectors 16 in each tool set. When a tool set is at the opening station 27, each pusher 32 is aligned with a corresponding connector and when the slide 28 is moved along the guide bars 29, the pusher enters the corresponding bore in the second tool 15, engages the connector and drives the connector from or partly from the second tool 15. Since the connectors are fixed with respect to the first tool, this raises the first tool from the second tool, so establishing the open condition of the tool set. Complementary tapers on the pushers and connectors establish friction which inhibits movement of the connectors from the pushers whilst the tool set is open. It will be understood that the pushers raise the first tool from the second tool before the ejector pins are moved relative to the second tool. A lateral projection 85 on the sprue element 19 cooperates with a pin mounted in the tool 15 to prevent the sprue element escaping from that tool. The pin also restrains rotation of the sprue element.

For moving the slide 28 relative to the guide plate 31, there is provided an hydraulic piston and cylinder unit 33, the cylinder of which is fixed with respect to the guide plate 31 and the body 10. The guide plate 31 is mounted just below the carrier 11 so that portions of the carrier lying between adjacent tool sets move over the guide plate during rotation of the carrier. A pneumatic piston and cylinder unit or an electrically energised device may be substituted for the unit 33. The stroke of the slide 28 is selected according to the moulding produced.

There is also provided at the opening station 27 a chute 34 for receiving ejected mouldings and means for delivering ejected mouldings to the shoot. The latter means may be a nozzle 81 for directing a jet of air between the tools 1 and 15 towards the chute.

At a heat transfer station 35 spaced around the axis 12 from the opening station 27, there is provided at least one heat exchanger for engaging a tool set at the heat transfer station and transferring heat between the tool set and a head transfer fluid. Generally, heat will be transferred from the tool set to the heat transfer fluid, in order to avoid the temperature of the tools 14 and 15 rising to an unacceptable level. However, at start-up after a period during which the apparatus has been idle, heat may be transferred from the heat transfer fluid to a tool set, in order to avoid premature freezing of moulding composition which is injected into the mould cavity 17.

Figure 8:
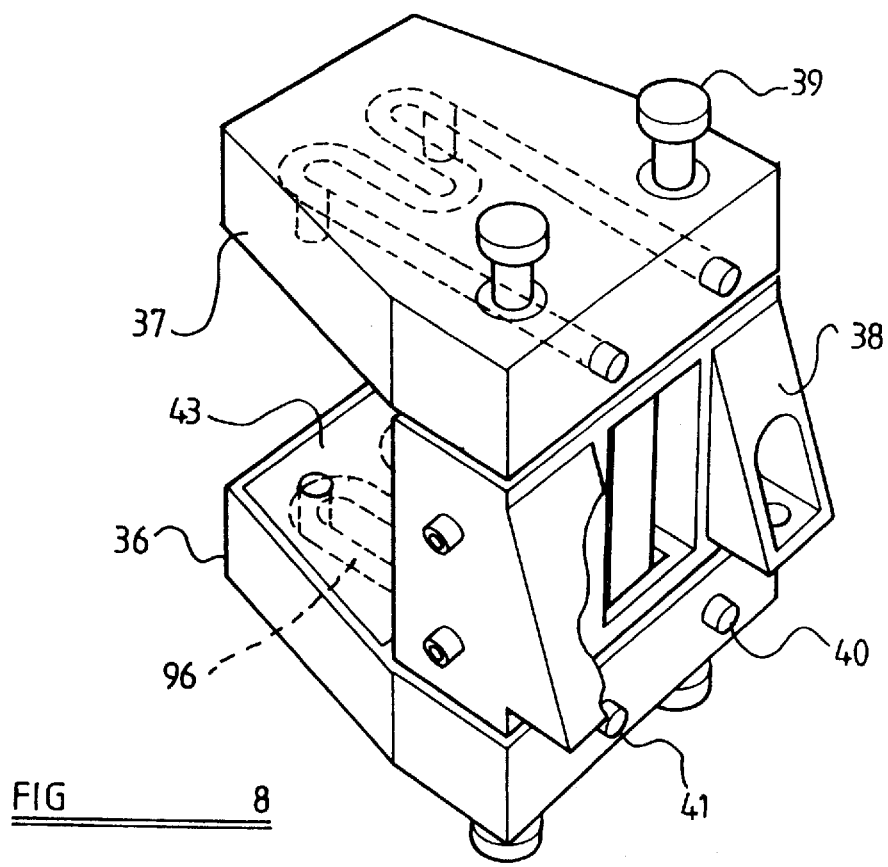
FIG. 8 shows a perspective view of cooling means incorporated in the apparatus of FIG. 1.
Figure 9:
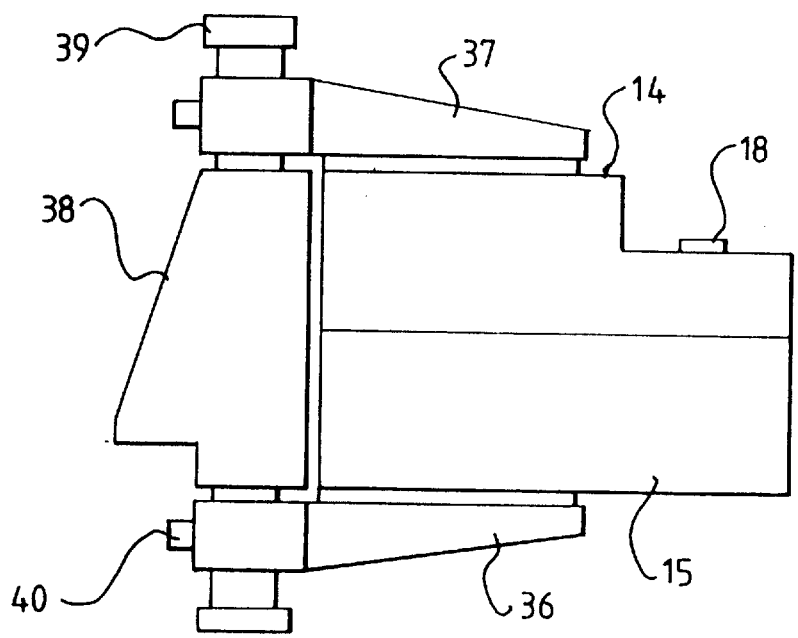
FIG. 9 shows a diagrammatic representation of an elevation of the cooling means of FIG. 8 in combination with the mould set shown in FIG. 2.

In FIG. 8, there is shown a pair of heat exchangers 36 and 37 which are mounted on the body 10 at the heat transfer station 35. The heat exchangers are both mounted on a support 38 for sliding relative to the support towards and away from each other. The support guides the heat exchangers for movement along a common rectilinear path. The support 38 is fixed on the body 10 in any convenient manner.

Adjustable stops 39 are provided on the support 38 for limiting the travel of the heat exchangers 36 and 37 in directions away from each other. Driving means is provided in the support 38 for moving the heat exchangers from their stops towards each other into pressure contact with a tool set at the heat transfer station 35. The driving means may be a piston and cylinder unit. It will be understood that, when the heat exchangers 36 and 37 are withdrawn from each other into engagement with the stops 39, there is between them a gap sufficiently wide for the tool set, when in its closed condition, to pass through the gap without contact being made with the heat exchangers.

The heat exchanger 36 comprises a block of copper or other metal which is a relative good conductor of heat. In this block, there is formed a passage 96 for the flow of a heat transfer fluid through the heat exchanger between an inlet 40 and an outlet 41. The heat exchanger 36 further comprises a face plate 43 at that face of the heat exchanger which engages the tool set at the heat transfer station when the heat exchangers are moved towards each other. The face plate 43 is formed of steel or other relatively hard-wearing metal. The heat exchanger 37 is preferably identical with the heat exchanger 36 but is mounted with its face plate facing towards the heat exchanger 36.

The inlet 40 and outlet 41 of both heat exchangers may be connected by flexible hoses (not shown) with a remote cooler 44 mounted in the body 10. The cooler may be a known heat exchanger adapted to facilitate the transfer of heat to air and a fan may be provided to blow air through the cooler. Additionally, there may be provided heating means for supplying heat to the heat transfer fluid during start-up. A pump 45 is provided to pump the heat transfer fluid through the cooler or the heater and through the heat exchangers.

Figure 1:
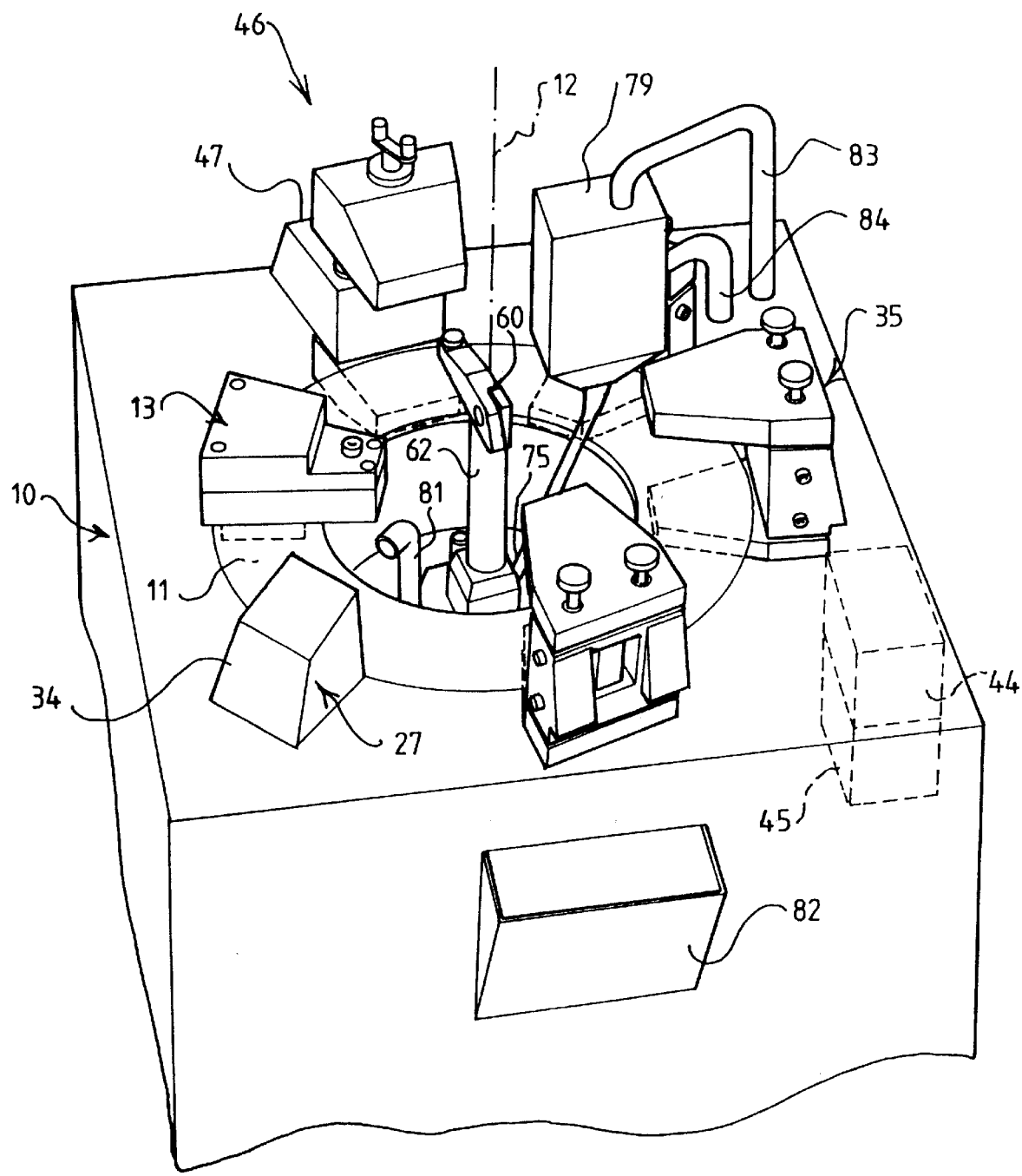
FIG. 1 shows a diagrammatic representation of the injection moulding apparatus, viewed from above and to one side and with the outline only of a cover shown.

As shown in FIG. 1, there may be a plurality of heat transfer stations, each being equipped with heat exchangers corresponding to the heat exchangers 36 and 37.

There may be formed in one or both of the tools 14 and 15 one or more passages through which a heat transfer medium can be conveyed whilst the mould set is at a heat transfer station A representative passage is shown in the tool 14 at 87 in FIG. 3. The coolant passage 87 incorporates valves (not shown) for closing the ends of the coolant passage whilst the mould set is out of the heat transfer station. The heat exchangers 36 and 37 incorporate connectors controlled by respective valves (not shown) for communicating with the heat transfer passage 87 of a mould set at the heat transfer station. Movement of the heat exchangers 36 and 37 may be used to open the valves in the heat transfer passage 87 for flow of coolant through the tool, whilst the mould set is in the heat transfer station.

At an injection station 46 which is spaced around the axis 12 from the opening station 27 and from all of the heat transfer stations, there is provided a clamping device 47 for clamping together the tools 14 and 15 of a tool set at the injection station. The clamping device is adapted to establish a relatively high contact pressure between the tools. Although the retaining means holds the tools in a closed condition, it does not maintain a high contact pressure between the tools.

The clamping device 47 includes a support 48 which is fixed to the body 10 in a convenient manner. On the support 48, there is provided a pair of jaws 49, 50. The support 48 includes a pair of rectilinear, parallel guide bars which are fixed to the jaw 49 and on which the jaw 50 slides.

The clamping device 47 further comprises a reaction member 52 connected with the jaw 49 by a pair of threaded, rotatable shafts 53. These shafts engage female screw threads formed in the reaction member 52 and the reaction member can be moved towards and away from the jaw 49 by turning of the shafts 53. A hand wheel 54 on the jaw 49 is connected with the shafts by suitable gearing to facilitate turning of the shafts for setting of the position of the reaction member 52 relative to the jaw 49. The jaw 50 lies between the jaw 49 and the reaction member 52. An end plate 57 is attached to the guide bars 51 at the ends thereof remote from the jaw 49 and corresponding end portions of the threaded shafts 53 are rotatably mounted in the end plate.

The clamping device 47 further comprises a toggle linkage 55 connected between the reaction member 52 and the jaw 50. A piston and cylinder unit 56 is mounted on the support 48 and is connected with the toggle linkage for operating that linkage.

Figure 5:
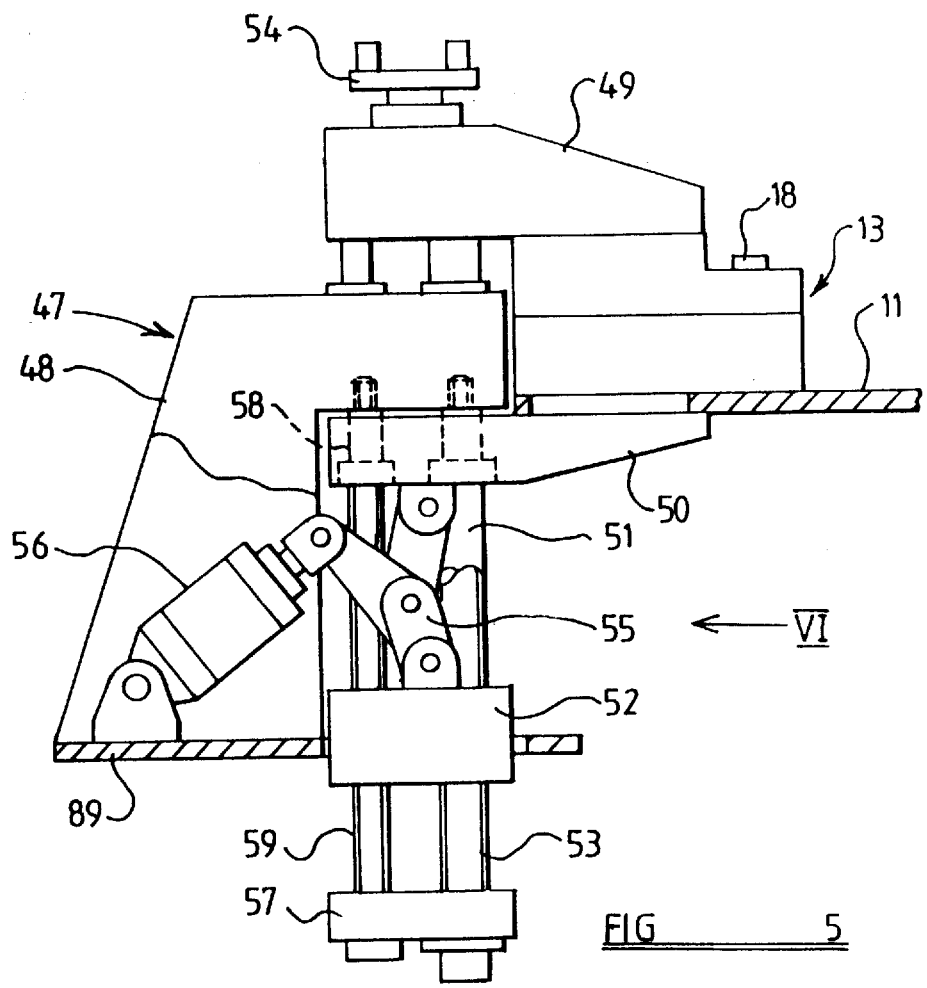
FIG. 5 shows partly in elevation and partly in cross section clamping means incorporated in the apparatus of FIG. 1.
Figure 6:
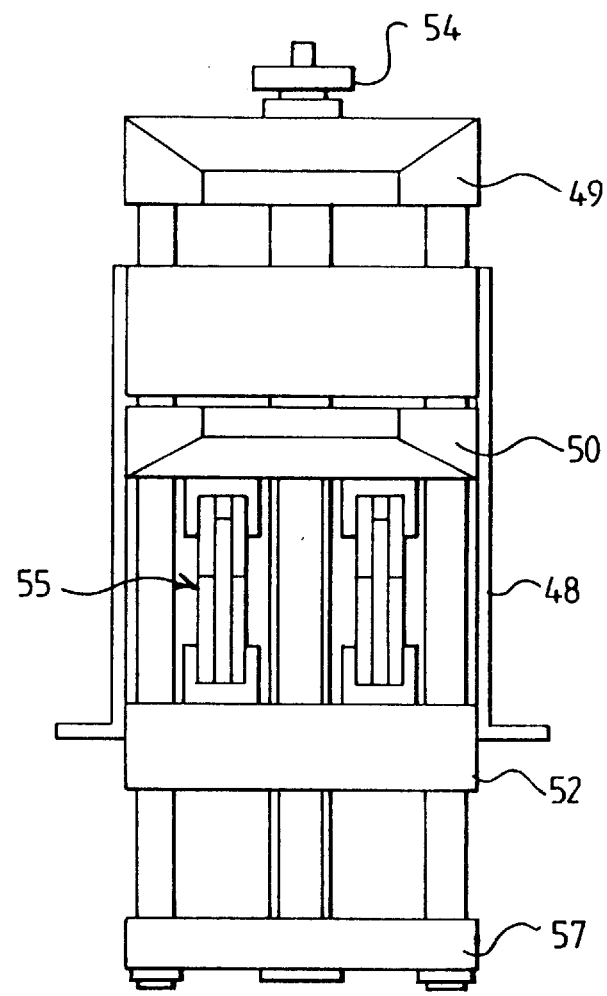
FIG. 6 shows the clamping means of FIG. 5, as viewed in the direction of the arrow VI in FIG. 5.

The jaw 50 of the clamping device is connected with the support 48 by connecting means which permits limited movement of the jaw 50 relative to the support. The particular example of connecting means shown in FIG. 5 comprises a pair of stepped bolts 58 which allow small movements of the jaw 50 relative to the support in a direction along the guide bars 51. The position of the jaw 50 relative to the support 48 is always such that the jaw 50 lies below the carrier 11. The jaw 50 may, however, move into engagement with the underside of the guide plate 86. The jaw 49 is spaced upwardly from the carrier 11 sufficiently for a tool set 14, 15 to be received between the jaws 49 and 50, when the tool set is in the closed condition.

The clamping device 47 further comprises a pair of pre-stressing screws 59 which are connected by suitable gearing with the handle wheel 54 to be turned when the threaded shafts 53 are turned. The screws 59 are arranged to subject the clamping device 47 to stress when the jaws 49 and 50 are out of contact with a tool set. When the toggle linkage is operated to drive the jaws 49 and 50 into pressure contact with the tool set, this pre-stress is relieved but there is no unacceptable distortion of the clamping device.

There is also provided at the injection station 46 an injection head 60 through which a moulding composition can be injected into a tool set at the injection station. The injection head is mounted on feed means 61 for feeding the moulding composition to the injection head. The feed means is disposed at the center of the carrier 11 and is intersected by the carrier axis 12. Thus, the feed means is nearer to the carrier axis than are the tool sets.

Figure 7:
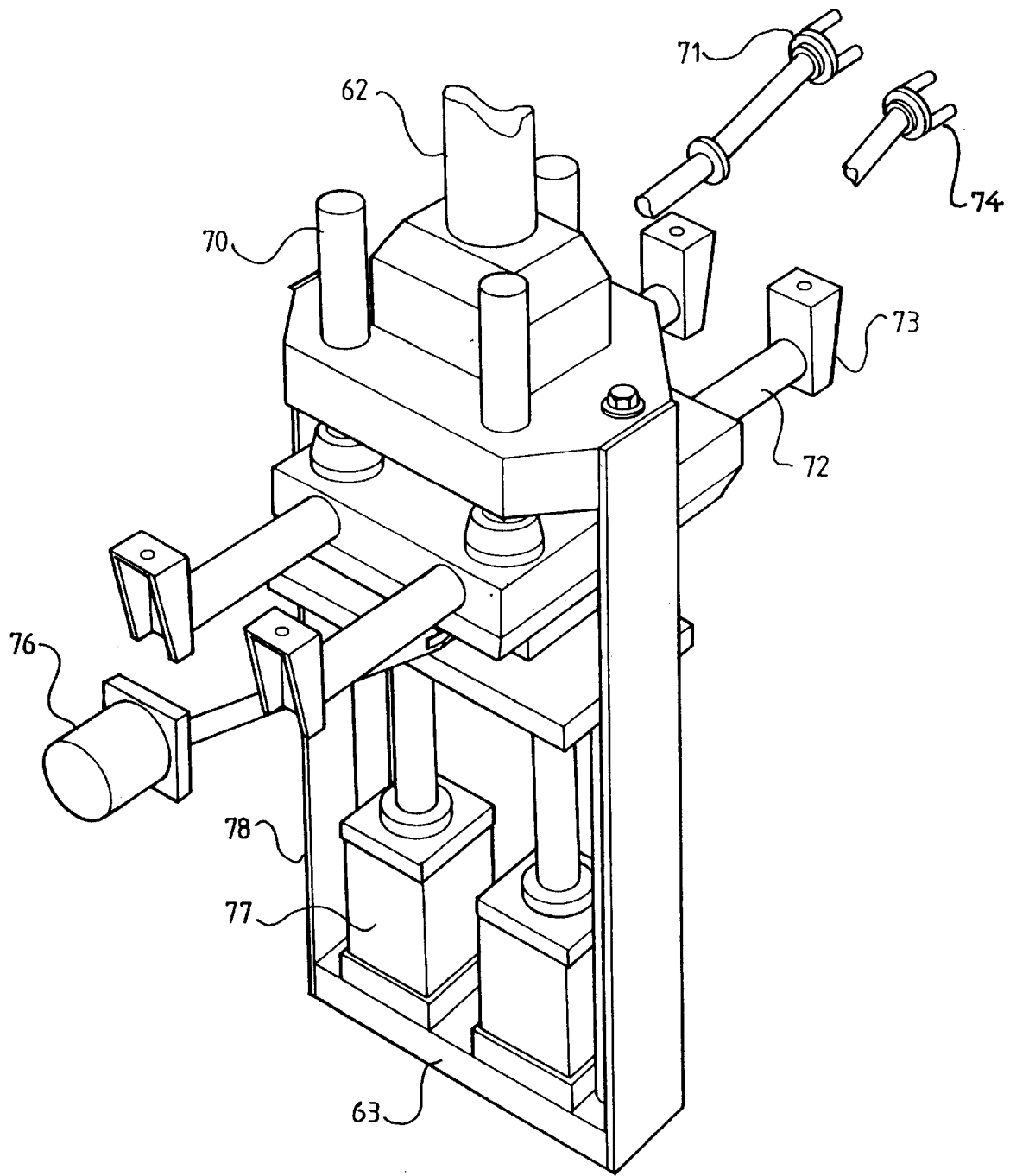
FIG. 7 shows a diagrammatic representation of a perspective view of means incorporated in the apparatus of FIG. 1 for injecting a moulding composition into a mould set.

The feed means 61 is shown in FIG. 7 isolated from other parts of the apparatus. The feed means includes a hollow injection body 62 which extends upwardly from a base 63 disposed below the level of the carrier 11, through the central opening of the carrier, to a position above the level of the carrier. The injection head 60 is an elongated, hollow member which is mounted on the injection body 62 for pivoting relative thereto about a pivot axis 64 which is transverse to the carrier axis 12. The injection head and the axis 64 lie adjacent to an upper end of the body 62. Accordingly, an end portion of the injection head remote from the injection body 62 is movable upwardly and downwardly relative to the carrier 11. The interior of the injection head 60 is in communication with the interior of the injection body 62 throughout pivoting movement of the injection head relative to the injection body. First positioning means is provided for adjusting the position of the injection body 62 relative to the body 10 and second positioning means is provided for moving the injection head relative to the injection body.

The second positioning means comprises a piston and cylinder unit 65 which acts on the injection head through the intermediary of a toggle linkage 66. The second positioning means is used for driving an outlet nozzle 67 of the injection head onto the inlet nozzle 18 of a tool set at the injection station. The travel of the outlet nozzle 67 is sufficient to depress the inlet nozzle 18 into the first tool 14 and drive the sprue element 19 into the charging position.

It will be noted that, in the example illustrated, the outlet nozzle 67 is above the inlet nozzle 18 and the injection head 60 pivots upwardly and downwardly relative to the injection body 62. By extending the piston and cylinder unit 65, the injection head can be pivoted upwardly to move the outlet nozzle 67 clear of the inlet nozzle 18.

The injection head 60 contains a shut-off valve 68 for preventing flow of moulding composition from the injection head through the outlet nozzle 67. There is formed in the outlet nozzle an annular seat for receiving the shut-off valve. This seat is immediately adjacent to an orifice at a lower end of the outlet nozzle, through which orifice the moulding composition leaves the outlet nozzle to enter the inlet nozzle 18 of a mould set. As shown, the valve may have a small projection which extends into this orifice. The valve 68 is carried on a stem 69 which extends upwardly from the valve along the axis of the outlet nozzle 67, through a nozzle retainer 108 mounted in the injection head 60 and into a chamber 109. The chamber 109 is divided by a diaphragm 110 into upper and lower parts having respective inlets for admitting fluid under pressure. An upper end portion of the valve stem 69 is secured to the diaphragm at the middle of the diaphragm.

Coolant passages 111 are formed in the nozzle retainer 108. Flow of coolant through these passages minimises the transmission of heat from the plastics composition in the outlet nozzle 67 to the diaphragm 110. The diaphragm may also be cooled by means of hydraulic fluid admitted to the chamber 109 during operation. If the diaphragm 110 is formed of a material which can withstand elevated temperatures without deterioration, then the coolant passages 111 could be omitted.

The first positioning means comprises vertical shafts disposed inside cover tubes 70 on the injection body 62. These shafts are in screw-threaded engagement with the injection body and transmission means is provided for transmitting rotary movement from a hand wheel 71 to the screws to raise and lower the injection body 62 relative to the base 63.

The base 63 is slidably mounted on horizontal guide bars 72 which are fixed to the body 10 by brackets 73. A screw and nut mechanism is provided for driving the base 63 along the guide bars 72 and a hand wheel 74 is provided for operating this screw and nut mechanism. The guide bars 72 are arranged with their lengths extending in the direction of length of the injection head 60.

There is provided in the injection body 62 a feed inlet 75 for admitting a moulding composition to the feed body. An elevated feed hopper 79 is arranged to deliver granules of the moulding composition to the feed inlet 75. This hopper is water-cooled.

In the injection body 62, there is provided a feed and injection screw 97 which is constructed, arranged and driven in a known manner. A motor 76 is provided on the body 10 for turning the injection screw, suitable transmitting means being provided for transmitting rotary motion from the motor 76 to the screw. A pair of piston and cylinder units 77 is provided for reciprocating the injection screw relative to the injection body 62 along an axis of the screw. These piston and cylinder units are supported on the injection body 62 by a supporting structure 78. The screw axis is vertical.

Electrical heating elements 112, 113 are provided in the injection body 62 and in the injection head 60 for heating the moulding composition to the required temperature, by the time that composition reaches the outlet nozzle 67. An electrical heating element is preferably incorporated in the outlet nozzle 67 to raise the temperature of the moulding composition to the required value, the temperature of the moulding composition upstream of the outlet nozzle 67 being significantly lower than the injection temperature. It will be noted that the moulding composition is fed upwardly through the injection body 62 by the injection screw and then is fed at least approximately horizontally through the injection head 60 to the outlet nozzle 67. The heating elements are controlled by a control system which includes thermo-couples in the outlet nozzle 67, the injection head 60 and the injection body 62.

The feed and injection screw 97 has a conical tip 98 and between the conical portion and the helical formation 99, there is a peripheral groove 100 containing a ring 101. The ring surrounds a tapered neck 102 of the screw and has a correspondingly tapered inner periphery which seats on the tapered neck of the screw adjacent to one end of the neck, when the screw is driven upwards. The ring is a close fit inside the bore of the body 62 so that it then operates as a piston on the moulding composition which lies within the bore of the body 62 and above the ring 101. When the screw is screwed downwards, a smaller diameter portion of the neck moves into the ring and this provides between the ring and the neck a clearance through which the moulding composition can flow under the action of the helical formation 99. This recharges the space between the screw tip 98 and the complementary end portion of the bore of the body 62 with the moulding composition.

An outlet from the bore of the body 62 is provided between the ends of that bore, at one side of the screw 97 and in the larger diameter portion of the conical surface of the bore which complements the tip 98. From this outlet, a rectilinear passage 103 leads upwardly through the body 62 to an annular transfer chamber 104. The passage 103 communicates with the transfer chamber near to one end thereof. The transfer chamber 104 surrounds the pivot axis 64. One part of the outer periphery of the transfer chamber is defined by the injection body 62 and the other part of the outer periphery of the transfer chamber is defined by the injection head 60. A heating element 105 extends along the transfer chamber at the centre thereof. A passage 106 formed in the injection head 60 extends tangentially from the transfer chamber 104 adjacent to a second end thereof to the outlet nozzle 67.

A heating element 107 is mounted in the injection head 60 and extends into the outlet nozzle 67 so that there is provided in the outlet nozzle an annular chamber for receiving the moulding composition from the passage 106. This passage communicates with the annular chamber and approaches that chamber in a direction at right angles to a longitudinal axis of the outlet nozzle.

There may be substituted for the shut-off valve 68 an alternative shut-off valve mounted in the injection body 62 for closing the passage 103 This alternative shut-off valve may, for example, comprise a rotatable plug which intersects the passage 103 and has a bore through which the moulding composition can flow when the valve is in an open position.

The control system of the apparatus includes a microprocessor (not shown) having input means for receiving data relating to the mouldings to be produced, to the tools in which the mouldings are to be formed and the conditions under which the mouldings are to be produced, including the duration of successive stages of operation of the apparatus. The input means may include one or more known input devices, for example a keyboard, a disc drive and a tape-reader. The control system also includes sensing devices incorporated within the apparatus for providing information to the microprocessor. These sensing devices include the thermo-couples previously mentioned and proximity switches or other known devices for detecting the presence of and position of tools and other components.

In preparation for use of the apparatus, a number of mould sets is mounted on the carrier 11 in respective predetermined positions. The mould sets may be substantially identical with one another. Alternatively, the mould sets may define different mould cavities, differing in size and/or shape. During mounting of the mould sets on the carrier, the carrier is indexed about the axis 12. Each mould set may be mounted on the carrier at a position between the unlocking and opening station 27 and the injection station 46. The mould sets are rigidly secured to the carrier. Respective inlet nozzles 18 of the mould sets lie in corresponding positions, that is to say at the same distance from the axis 12 and spaced apart equally around the axis, although the apparatus may be operated with a number of mould sets on the carrier less than the maximum number of mould sets which can be accommodated on the carrier.

During an initial stage of operation, heated fluid may be passed through the heat exchangers at the heat transfer station 35 and other heat transfer stations to raise the temperature of the mould sets passing through the heat transfer stations. This initial stage may comprise more than one complete revolution of the carrier 11, in which case no moulding composition is introduced into the mould sets during the initial stage of operation. The mould sets are moved through all of the stations in turn until the temperature of each mould set has attained a sufficiently high value to avoid risk of the moulding composition freezing prematurely in a mould set and either preventing proper injection of the required amount of moulding composition or producing a defective moulding.

After a mould set has moved into the injection station 46, the clamping device 47 is operated to clamp the tools 14 and 15 of the mould set together under relatively high pressure. The injection head 60 is then pivoted downwards by the piston and cylinder unit 65 into engagement with the inlet nozzle 18 and drives the inlet nozzle downwards to move the sprue element 19 into the charging position. The lower part of the chamber 109 is pressurised to open the valve 68. It will be understood that the pressure in the injection nozzle 67 is not high when the screw 97 is not driven. The piston and cylinder units 77 are then actuated to inject a quantity of moulding composition downwards through the inlet nozzle 18 and the associated sprue passage into the mould cavity of the mould set. The upper part of the chamber 109 is then pressurised to close the shut-off valve 68 and the unit 65 is operated to raise the outlet nozzle 67 from the inlet nozzle 18 and to allow the sprue element 19 to move to the severing position. The clamping device 47 is then operated to release the mould set. It will be understood that the tools 14 and 15 are held in the closed position by the retaining means acting on the connectors 16.

The shut-off valve 68 is closed and the outlet nozzle is raised from the inlet nozzle 18 immediately after the required amount of moulding composition has been injected into the mould cavity. Accordingly, the sprue plate is permitted to move to its severing position whilst the moulding composition in the sprue passage is in a molten or plastic composition. The moulding composition does not significantly obstruct movement of the sprue plate. Any moulding composition occupying the outlet orifice of the outlet nozzle 67 when that nozzle is raised from the inlet nozzle 18 remains with the moulding composition in the inlet nozzle.

The carrier 11 is indexed to the next position, carrying the mould set from the injection station 46 to the heat transfer station 35. When the mould set has reached at least approximately the normal working temperature, the supply of a heated fluid to the heat exchangers 36 and 37 is terminated and a coolant is supplied to these heat exchangers. At the heat transfer station, the heat exchangers 36 and 37 are driven into firm contact with upwardly and downwardly facing surfaces of the mould set to establish a thermally transmitting relation therewith. This relation is maintained during the period when the next following mould set is clamped by the clamping device 47 at the injection station. When the following mould set is released by the clamping device, the heat exchangers 36 and 37 are moved out of engagement with the mould set at the heat transfer station so that the mould set can be moved by the carrier to successive heat transfer stations and then to the unlocking and opening station.

When the tool set is positioned in the unlocking and opening station, the finger 25 is raised into engagement with the locking element 22 and drives the locking element upwardly to release the holding elements 21 for sliding towards each other. The piston and cylinder unit 33 is then extended further to cause the pushers 32 to engage the connectors 16 and drive the connectors upwardly out of the second tool 15 so that the mould set is opened. As the first tool 14 approaches a fully-raised position, the ejector pins are driven upwardly to eject the moulding from the mould cavity. A jet of air from an air nozzle 81 carries the moulding to the shoot 34.

The plastics sprue also is removed from the mould set. This may be achieved mechanically, for example by means of a grab which advances to the sprue, grips the sprue and then retracts from the tool set, or by means of an air jet. The sprue is cut up and is returned to the hopper.

In a case where additional cooling of the moulding is required before the moulding is removed from the mould set, the mould set may be permitted to travel through the unlocking and opening station 27 without operation of the piston and cylinder unit 33 to open the mould set. The mould set would then travel through the injection station 46 without operation of the piston and cylinder units 77 and so back to the heat transfer stations. In this way, one particular mould set or all of the mould sets may be cooled for a relatively long period before the moulding formed therein is removed. Furthermore, in order to prevent cooling of the moulding at an unacceptably high rate, one of the heat transfer stations may be used to impart heat to the mould set, in order to reduce the overall rate of cooling. Control of the piston and cylinder unit 33 and of the piston and cylinder units 77 by the microprocessor facilitates subjecting one mould set to a cooling cycle which differs from the cooling cycle to which another mould set on the carrier 11 is subjected. This is useful when significantly different mouldings are produced in respective mould sets on the carrier.

It will be noted that, in a case where the control means is programmed to inject different amounts of moulding composition into successive tool sets, after the moulding composition has been injected into a first tool set, the screw motor 76 is operated for a period to feed only that quantity of moulding composition which is to be injected into the next mould set. This avoids premature heating of the moulding composition to the injection temperature and minimises the period for which the moulding composition is maintained at the injection temperature. This is important in cases where the moulding composition deteriorates at the injection temperature.

Whilst the tool set is still positioned in the unlocking and opening station, the slide 28 is retracted from the tool set. The first tool 14 is moved by gravity towards and onto the second tool 15 to close the mould set. If the connectors 16 move fully home into the tool 15, then the holding elements 21 will be driven into respective recesses in the connectors by the camming action of the locking element 22. Alternatively, if the connectors do not move fully home into the second tool 15 at the unlocking and opening station, the connectors will be driven fully home when the mould set is in the injection station 46 and the clamping device 47 acts on the mould set. If required, there may be provided at the unlocking and opening station or at an intermediate station means for exerting on the first tool 14 a force additional to the force of gravity to drive the connectors fully home into the second tool 15.

During operation of the apparatus, the moulding composition in granular form is fed through the cooled, elevated hopper 79 to the inlet 75 and passes from that inlet into a heating chamber containing the injection screw. It will be noted that the screw is rotatable about a vertical axis within the injection body 62. The moulding composition is driven upwards intermittently by the screw and is melted in the injection body 62.

The injection screw is rotated whilst the shut-off valve 68 is closed, in order to feed the required quantity of moulding composition to the downstream end of the screw. Pressure established in the moulding composition downstream of the screw helps to maintain the shut-off valve closed. The amount of composition delivered to the downstream end of the screw is determined by the duration of the period for which the screw is turned and this is controlled by the microprocessor according to the volume of the composition which is to be injected into the mould set. There may be on the carrier 11 mould sets which differ from one another and the volume of moulding composition to be injected may differ from one mould set to another. In this case, information concerning the required volumes of moulding composition for each mould set is entered into the microprocessor and the microprocessor controls energisation of the screw drive motor accordingly.

The volume of the moulding composition which occupies the passage 103, the transfer chamber 104, the passage 106 and the outlet nozzle 67 is typically greater than the volume of moulding composition which is injected into one tool set to form one or more mouldings therein. Typically, the volume of moulding composition which is downstream of the feed and injection screw 97 is equivalent to three or four times the volume of moulding composition to be injected into a single tool set. Accordingly, the moulding composition is downstream of the feed and injection screw but retained in the injection body and injection head for a period which corresponds to the movement of three or more mould sets through the injection station. In consequence of the position of the outlet from the tapered end of the bore of the injection body 62, flow of the moulding composition from that bore into the passage 103 is severely turbulent. The flow of moulding composition through the transfer chamber 104 is substantially along a spiral path, in consequence of the moulding composition approaching and leaving the transfer chamber along respective paths which are tangential to that chamber and are spaced apart along the chamber. Further severe turbulence of the moulding composition is caused as that composition flows from the passage 106 into the outlet nozzle 67. The turbulent flow and the period for which the moulding composition is retained in the passages 103 and 106, the transfer chamber 104 and the outlet nozzle 67 contribute to conditioning of the moulding composition to ensure that the temperature of the moulding composition is uniform before that composition is injected into a mould set. It will be noted that the length of the passage 103 is many times the width of that passage and the length of the passage 106 is many times the width of that passage. These passages are preferably cylindrical.

It will be noted that the space adjacent to the outer periphery of the carrier 11 is not obstructed by the injection head 60, the injection body 62 or associated parts of the apparatus. Accordingly, there is no significant restriction on the space available to accommodate the clamping device 47 which is disposed adjacent to the outer periphery of the carrier. A strong and powerful clamping device can be provided conveniently and this enables a high clamping force to be applied to the tools of each mould set at the injection station.

The opening station 27 is well-spaced from the clamping device 47 and from the injection head 60 and the injection body 62. Access to the mould set at the opening station is not restricted significantly. Accordingly, there can be provided at the opening station a plurality of devices for disengaging mouldings from the tools of the mould set. For example, there may be provided two such devices at opposite sides of the mould set. This facilitates extraction from the tools of, for example, a moulding having respective threaded portions at opposite ends of the moulding.

It will also be noted that the inlet nozzle 18 is mounted in the first tool 14 at a position near to the or each mould cavity. The sprue passage formed in the sprue element 19 provides communication between the inlet and the or each mould cavity. There is no requirement for machining of the tools to provide passages additional to those defined by the sprue element and the inlet nozzle 18. It will also be noted that the inlet nozzle 18 is spaced inwardly from the periphery of the tool set, as viewed in a direction at right angles to the interface between the tools 14 and 15. It is not necessary to provide in the mould set passages for the flow of the moulded composition which extend to the periphery of the mould set. Accordingly, the amount of machining necessary to produce the tools 14 and 15 is relatively small. The inlet nozzle 18 is accessible to the outlet nozzle 67 at an upwardly facing surface of the tool 14 and this surface is nearer to the second tool 15 than is the surface of the tool 14 on which the clamping device 47 bears.

The apparatus includes a storage hopper 82 which is charged intermittently with the granular moulding composition. The storage hopper may also be cooled by means of water or air cooling, if required. A pneumatic conveyor 83 is provided for conveying the moulding composition granules from a position within the storage hopper 82 and above the bottom of that hopper to the elevated hopper 79. The elevated hopper has a weir over which excess moulding composition can fall and return to the storage hopper 82 along overflow duct 84. The moulding composition moves under the action of gravity from the elevated hopper 79 to the inlet 75. The duct leading to the inlet 75 preferably communicates with the elevated hopper at a level above the bottom of that hopper so that any foreign matter which enters the hopper and falls to the bottom of the hopper will not then be fed into the inlet 75. The top of the elevated hopper 79 is closed, except for an air outlet and the air outlet is closed by an air filter. The main hopper 80 also is normally closed by a removable lid which prevents foreign matter entering the hopper.

It will be noted that operation of the apparatus is a continuous, cyclical process. Each mould set travels along an endless path through each of the stations. Typically, each mould set dwells at each station for the same period. Whilst a moulding is being removed from a first mould set, a second mould set is being cooled and moulding composition is being injected into a third mould set. The first mould set is then advanced towards or into the injection station and further moulding composition is injected into the first mould set. The time required for a mould set to return to the injection station is determined by the number of stations, the dwell at each station and the time taken to travel between adjacent stations.

In the example of apparatus illustrated in the accompanying drawings, the devices at the several stations, for example the injection head 60, the clamping device 47, the heat exchangers 36 and 37 and the pushers 32 and associated components are mounted on or in the body 10 which is stationary during use of the machine. Alternatively, the carrier 11 may be fixed on a stationary base which rests on the floor and the body 10 may be turned relative to the carrier by the drive means. With this arrangement, the several devices which operate on the mould sets would travel along a common path from one mould set to another. Alternatively, the devices for operating on the mould sets may travel along respective different paths and these paths may be defined by known guide means. In practice, there will generally be more than one mould set but the apparatus could be used to form mouldings in one mould set only, other mould sets being idle, and the invention may be used in a case where there is only a single mould set.

In addition to or as an alternative to the provision to the microprocessor of information concerning the amount of moulding composition to be injected into each mould set by way of the input means, this and other information may be presented by the tool sets. Such information may be presented on a tool set by an adjustable indicator, the position of which relative to a reference position indicates the amount of moulding composition required by that tool set. For transferring such information to the microprocessor, there is provided a mechanical feeler for contacting the indicator of the tool set and a known transducer for providing to the microprocessor an electrical signal representing the position of the indicator.

In the example of apparatus illustrated in the accompanying drawing, there is a single injection screw for feeding the moulding composition through the injection head 60. The apparatus may be modified by the provision of a plurality of injection screws, each operating in a respective heating chamber, and the heating chambers all communicating with the injection head. In this way, a larger volume of moulding composition can be injected into each mould set without the use of larger injection screws, which would increase the overall height of the apparatus.

In a further alternative arrangement, there is provided a plurality of injection screws, each feeding the moulding composition through a respective injection head to the mould set either at a common injection station or at respective injection stations. Thus, respective moulding compositions which differ from each other, for example in respect of colour, may be injected into a single mould set.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

We claim:

1. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, where access to a mould set is provided by openings in the carrier on which the mould set rests and used by means to operate on a mould set and where said means is selected from a group consisting of:

feed means, within the injection body, which contains an injection screw, extends upwardly from a base disposed below the level of said carrier through an opening in said carrier to a position above the level of said carrier and uses the injection screw upwardly arranged for feeding the moulding composition upwards to the injection head;

clamping means at said injection station, for clamping in a closed condition a mould set, said clamping means comprising a pair of opposed jaws between which a mould set is received, where one of said pair of jaws lies below the level of said carrier and the other one of said pair of jaws lies above the level of said carrier, and said clamping means operates while said mould set rests on the carrier adjacent to an opening in the carrier;

opening means, where said apparatus further comprising an opening station and each of said mould sets comprising first and second mould tools between which there is a mould cavity, a plurality of connectors extending from the first tool into respective openings formed in the second tool, said opening means comprising a plurality of pushers, one for each connector of the mould set, the pushers being movable relative to the said carrier for engaging the connectors of the mould set at said opening station and moving the connectors relative to the second tool.

2. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, wherein the feed means, within the injection body which contains an injection screw, uses the injection screw upwardly arranged for feeding the moulding composition upwards to the injection head.

3. Apparatus according to claim 2 wherein the feed means includes a heater for heating the moulding composition at a level in the feed means below the level of the injection head.

4. Apparatus according to claim 2 wherein the carrier is rotatable about a carrier axis to move the mould sets through the station or stations and the feed means is intersected by the carrier axis or is nearer to the carrier axis than are the mould sets.

5. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, wherein the feed means, within the injection body, which contains an injection screw, extends upwardly from a base disposed below the level of the carrier through an opening in said carrier to a position above the level of the carrier and uses the injection screw upwardly arranged for feeding the moulding composition upwards to the injection head.

6. Apparatus according to claim 5 wherein the feed means includes a heater for heating the moulding composition at a level in the feed means below the level of the injection head.

7. Apparatus according to claim 5 wherein the carrier is rotatable about a carrier axis to move the mould sets through the station or stations and the feed means is intersected by the carrier axis or is nearer to the carrier axis than are the mould sets.

8. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, wherein the clamping means comprises a pair of opposed jaws between which a mould set at the injection station is received, a support for the jaws, connecting means for connecting the jaws with the support for limited movement of both jaws relative to the support and actuating means for driving the jaws towards each other, and wherein the jaws are arranged to engage the mould set and there are coolant passages which extend through the jaws to facilitate heat exchange between the jaws and the mould set.

9. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, wherein the clamping means comprises a pair of opposed jaws between which a mould set at the injection station is received, a support for the jaws, connecting means for connecting the jaws with the support for limited movement of both jaws relative to the support and actuating means for driving the jaws towards each other, and wherein the jaws are arranged on the two opposite sides of the carrier on which the mould set rests, to engage the mould set and there are coolant passages which extend through the jaws to facilitate heat exchange between the jaws and the mould set.

10. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, said injection head being adjustable relative to said carrier in a direction transverse to the direction of movement of said carrier by said driving means, said apparatus further comprising a positioning means for adjusting the position of the injection head when the injection head is in an injection position and in a withdrawn position.

11. Apparatus according to claim 10 wherein said positioning means includes means for moving the injection head in transverse directions in relation to the mould set at the injection station.

12. Apparatus according to claim 11 wherein one of said transverse directions is upwards and downwards and another of the transverse directions is inwards and outwards.

13. Apparatus according to claim 10 wherein said positioning means includes guides means for guiding the injection head and the injection body for movement together along an adjustment path.

14. Apparatus according to claim 13 wherein said adjustment path is rectilinear.

15. Apparatus according to claim 13 wherein said adjustment path is parallel to the carrier axis.

16. Apparatus according to claim 10 wherein said positioning means includes guide bars and a slide mounted on the guide bars.

17. Apparatus according to claim 10 wherein said positioning means includes a first rectilinear guideway, a slide for moving along the first rectilinear guideway and a second rectilinear guideway on the slide, wherein the body is mounted on the second guideway for movement relative to the slide and wherein the first and second guideways are transverse to each other.

18. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, said injection head being adjustable relative to said carrier in a direction transverse to the direction of movement of said carrier by said driving means, said apparatus further comprising positioning means for adjusting the position of the injection head when the injection head is in an injection position and in a withdrawn position and for moving the injection head between said injection position and said withdrawn position.

19. Apparatus according to claim 18, wherein said positioning means involve means for moving the injection head in transverse directions in relation to the mould set at the injection station.

20. Apparatus according to claim 19 where one of the said transverse directions is upwards and downwards and another of the said transverse directions is inwards and outwards.

21. Apparatus according to claim 18, wherein said positioning means includes guides means for guiding the injection head and the injection body for movement together along an adjustment path.

22. Apparatus according to claim 21 wherein said adjustment path is rectilinear.

23. Apparatus according to claim 22 wherein said adjustment path is parallel to the carrier axis.

24. Apparatus according to claim 21 wherein said positioning means includes guide bars and a slide mounted on the guide bars.

25. Apparatus according to claim 21 wherein the first positioning means includes a first rectilinear guideway, a slide for moving along the first rectilinear guideway and a second rectilinear guideway on the slide, wherein the body is mounted on the second guideway for movement relative to the slide and wherein the first and second guideways are transverse to each other.

26. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, said injection head being adjustable relative to said carrier in a direction transverse to the direction of movement of said carrier by said driving means, said apparatus further comprising a positioning means for moving the injection head between an injection position and a withdrawn position, wherein said positioning means is arranged for moving the injection head relative to the injection body and wherein said injection body contains an injection screw.

27. Apparatus according to claim 26 wherein said positioning means includes a toggle linkage.

28. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, said injection head being adjustable relative to said carrier in a direction transverse to the direction of movement of said carrier by said driving means, said apparatus further comprising first positioning means for adjusting the position of the injection head when in an injection position and in a withdrawn position, and second positioning means operable independently of the first positioning means for moving the injection head between said injection position and said withdrawn position.

29. Apparatus according to claim 28 wherein the second positioning means is arranged for moving the injection head relative to the injection body and wherein the said injection body contains an injection screw.

30. Apparatus according to claim 29, wherein the second positioning means includes a toggle linkage.

31. Apparatus according to claim 28, wherein the first positioning means includes guides means for guiding the injection head and the injection body for movement together along an adjustment path.

32. Apparatus according to claim 31 wherein the adjustment path is rectilinear.

33. Apparatus according to claim 31 wherein the adjustment path is parallel to the carrier axis.

34. Apparatus according to claim 28 wherein the first positioning means includes guide bars and a slide mounted on the guide bars.

35. Apparatus according to claim 28 wherein the first positioning means includes a first rectilinear guideway, a slide for moving along the first rectilinear guideway and a second rectilinear guideway on the slide, wherein the body is mounted on the second guideway for movement relative to the slide and wherein the first and second guideways are transverse to each other.

36. Apparatus according to claim 28 wherein said first positioning means includes means for moving the injection head in transverse direction in relation to the mould set at the injection station.

37. Apparatus according to claim 36 wherein one of the transverse direction in upwards and downwards and another of the transverse direction is inwards and outwards.

38. Injection moulding apparatus comprising a movable carrier, a plurality of mould acts on the carrier, driving means for moving the carrier to move the liquid sets in turn into an injection station, an injection head at the injection station, feed means for feeding a moulding composition through the injection head into a mould set at the injection station and clamping means for clamping in a closed condition at least one of said mould sets, wherein the injection head is mounted on an injection body for movement relative thereto and wherein the injection head and the injection body have respective internal passages which remain in mutual communication during the relative movement of the injection head and the injection body and wherein said injection body contains an injection screw.

39. Apparatus according to claim 38 wherein the injection head is mounted for pivoting about a pivot axis relative to the injection body.

40. Apparatus according to claim 39 wherein the pivot axis is transverse to the carrier axis.

41. Apparatus according to claim 38 wherein said relative movement of the injection head and the injection body is such that a portion of the injection head remote from the injection body moves along a path which is approximately parallel to the carrier axis.

42. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, and wherein each mould set includes first and second mould tools between there is a mould cavity and wherein the mould set there is a sprue element that defines a sprue passage which, when the sprue element is in the charging position, provides communication between the mould cavity and an inlet to the mould set and which is out of communication with the mould cavity when the sprue element is in the severing position, and wherein the said mould set includes a severing device for severing a moulded sprue from a moulding formed in the mould set and the severing device includes a sprue element mounted in one of the tools for movement relative to the tools between a severing position and a charging position, and biasing means for urging the sprue element into the severing position.

43. Apparatus according to claim 42 where the said injection head engages and actuates the severing device of a mould set at the injection station.

44. Apparatus according to claim 42 where a moulded sprue is separated from a moulding before the sprue has solidified and whilst the mould set remains closed.

45. Injection moulding apparatus comprising a movable carrier, a plurality of mould sets on the carrier, driving means for moving the carrier to move the mould sets in turn into an injection station and into one or more separate heat transfer stations, an injection head at the injection station, feed means for feeding a moulding composition through the injection head into a mould set at the injection station and clamping means for clamping in a closed condition at least one of said mould sets, and further comprising heat transfer means at said one or more separate heat transfer stations for applying heat to or extracting heat from a mould set at said one or more separate heat transfer stations, wherein said heat transfer means is arranged for engaging the mould set in thermally transmitting relation therewith and for movement out of said relation with the mould set at the heat transfer station.

46. Apparatus according to claim 45 wherein said heat transfer means includes a thermally conductive member and means for moving the member relative to the carrier into and out of said relation with a mould set at the heat transfer station.

47. Injection moulding apparatus comprising a movable carrier, a plurality of mould sets on the carrier, driving means for moving the carrier to move the mould sets in turn into an injection station and into one or more separate cooling stations, an injection head at the injection station, feed means for feeding a moulding composition through the injection head into a mould set at the injection station and clamping means for clamping in a closed condition at least one of said mould sets, and further comprising a cooling means at a cooling station for extracting heat from a mould set at the cooling station, where the cooling means are arranged on the two opposite sides of the carrier on which the mould set rests.

48. Apparatus according to claim 47 wherein the cooling means is arranged for engaging the mould set in thermally transmitting relation therewith and for movement out of said relation with the mould set at the cooling station.

49. Apparatus according to claim 48 wherein the cooling means includes thermally conductive member and means for moving the member relative to the carrier into and out of said relation with a mould set at the cooling station.

50. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station, clamping means for clamping in a closed condition at least one of said mould sets and where said carrier also moves the mould sets into a separate cooling station, said apparatus further comprising a pair of heat exchangers mounted for relative movement towards and away from each other and driving means for moving the heat exchangers into engagement with a mould set at said separate cooling station and for withdrawing the heat exchangers from that mould set, wherein each heat exchanger has at least one passage for flow of a heat transfer fluid through the heat exchanger.

51. Apparatus according to claim 50 wherein said heat exchangers have respective flat, mutually parallel, adjacent faces for engaging a mould set at the cooling station.

52. Apparatus according to claim 50 wherein each heat exchanger has a facing of relatively hard metal on a body which is a relatively good conductor of heat.

53. Apparatus according to claim 50 wherein at least one of said heat exchangers is adapted to exchange a heat transfer medium with the mould set.

54. Injection moulding apparatus comprising a movable carrier, a plurality of mould sets on the carrier, driving means for moving the carrier to move the mould sets in turn into an injection station, an injection head at the injection station, feed means for feeding a moulding composition through the injection head into a mould set at the injection station and clamping means for clamping in a closed condition at least one of said mould sets, each of said mould sets having a respective retaining means for retaining the mould set in a closed condition, said apparatus further comprising a releasing station including releasing means for setting in an inoperative condition the (releasing) retaining means of a mould set, at the releasing station, each mould set comprising first and second mould tools between which there is a mould cavity, said retaining means comprising a plurality of connectors extending from the first tool into respective openings formed in the second tool, each of said mould sets further including respective holding elements mounted in the second tool, said holding elements being movable therein between respective holding positions in which they engage the connectors to hold the connectors in the second tool and respective releasing positions in which they do not so engage the connectors, said mould sets still further including at least one locking element movable relative to the second tool between a locking position in which the locking element maintains the holding elements in the holding positions and a releasing position in which the locking element permits movement of the holding elements to their releasing positions.

55. Apparatus according to claim 54 further comprising biasing means for biasing the locking element to the locking position.

56. Apparatus according to claim 55 wherein the releasing means is engageable with the locking element of a mould set at the releasing station to move the locking element against the action of the biasing means to the releasing position.

57. Apparatus according to claim 54 further comprising a plurality of pushers, one for each connector of a mould set, the pushers being movable relative to the carrier for engaging the connectors of a mould set at an opening station and moving the connectors relative to the second tool.

* * * * *